Jan. 23, 1968
D. R. BROWN ETAL
3,364,567
ENCAPSULATED ELECTRICAL DEVICE AND
METHOD OF FABRICATING SAME
Filed Sept. 14, 1965
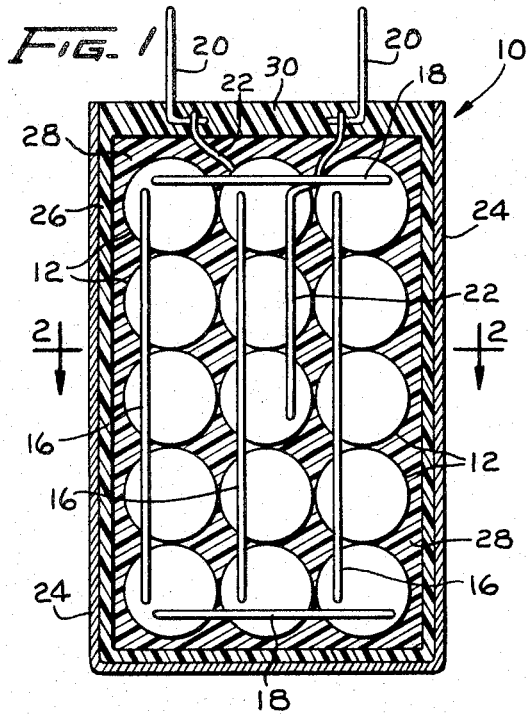
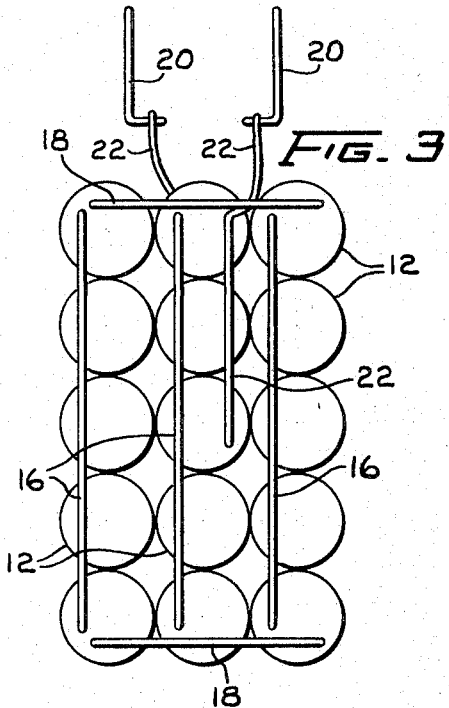
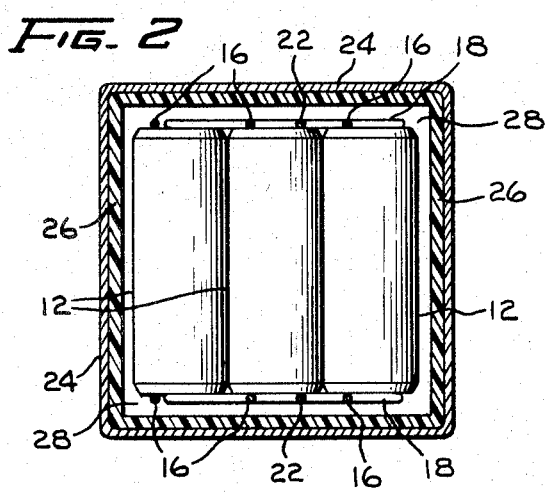
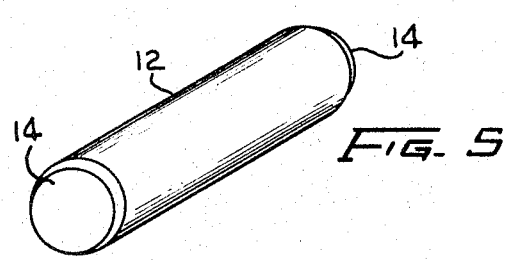
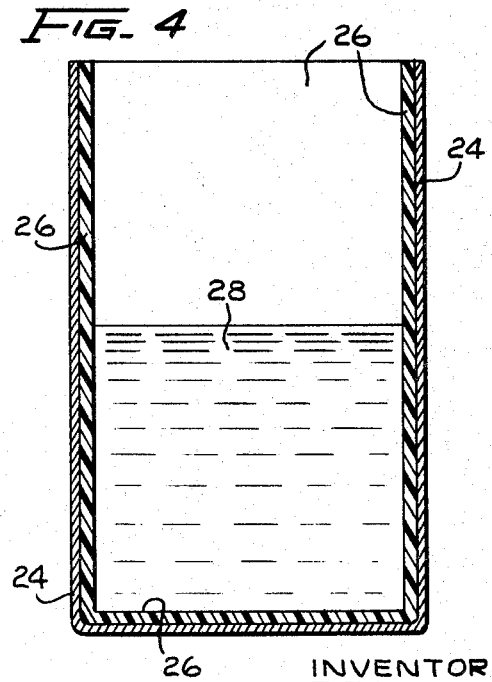
INVENTORS
D.R. BROWN
J.J. MELLON
J.A. TORO
BY A.C. Schwarz, Jr.
ATTORNEY United States Patent Office 3,364,567
Patented Jan. 23, 1968

3,364,567
ENCAPSULATED ELECTRICAL DEVICE AND METHOD OF FABRICATING SAME
Donald R. Brown, Downers Grove, and John J. Mellon, Westchester, Ill., and Joseph A. Toro, Berkeley Heights, N.J.; said Toro assignor to Bell Telephone Laboratories, Incorporated, and said Brown and said Mellon assignors to Western Electric Company, Incorporated
Filed Sept. 14, 1965, Ser. No. 487,113
5 Claims. (Cl. 29—627)

This invention relates to a method of fabricating an encapsulated electrical device, and more particularly to a method of making a potted multicomponent capacitor assembly.

Objects of the invention are the method of producing an encapsulating structure for yieldably supporting a device in hermetically sealed condition.

Other objects of the invention are to provide a method of fabricating an electrical multicomponent assembly and of enclosing the assembly in a moisture sealing and vibration damping package.

A structure and method illustrating certain aspects of the invention may include a plurality of electrical components arranged side by side in a plurality of parallel rows and secured together to form an assembly by resistance welding strap wires longitudinally of the rows to terminals on opposite ends of the components and welding strap wires transversely of the rows to the terminals on opposite ends of the end components of the rows. Portions of a pair of lead wires are welded respectively to terminals on opposite ends of several of the components and connector terminals are welded to the free ends of the lead wires.

To form an encapsulating receptacle for the component assembly, a metal container having an open end is provided with a lining of resin such as epoxy. Into the lined container is poured a predetermined amount of fluid potting compound such as polyurethane which cures at substantially room temperature and forms a resilient body. The component assembly is submerged in the fluid compound with the connector terminals extending upwardly therefrom. The potting compound is then cured and forms a resilient cushion for supporting the component assembly. Additional fluid epoxy resin in poured into the upper end of the open container and is cured to form a closure which bonds to and cooperates with the epoxy lining to encapsulate the capacitor assembly and to seal the connector terminals therein with portions of the terminals extending therefrom.

Further objects, advantages and novel aspects of the invention will become apparent from consideration of the following detailed description, in conjunction with the accompanying drawing, in which:

FIG. 1 is a vertical sectional view through the encapsulated multicomponent electrical device;

FIG. 2 is a cross-sectional view of the device taken on the line 2—2 of FIG. 1;

FIG. 3 is a side view of the electrical component assembly;

FIG. 4 is a vertical sectional view of the lined, open-ended container with a quantity of liquid potting compound for receiving the electrical component assembly therein; and FIG. 5 is a perspective view of one of the electrical components.

Referring to the drawings, the encapsulated multicomponent electrical device 10 comprises a plurality of electrical components 12 which are arranged in rows and secured together to form a component assembly 13 FIG. 3).

The present electrical components 12 as shown herein are in the form of wound capacitors, each comprising a pair of dielectric webs, and a pair of tin-alloy foil electrodes interleaved and wound into a roll with the foil electrodes supported by the webs in insulated relation to one another and with portions of the alternate foil electrodes extending respectively from opposite ends of the capacitors and spin swaged to form terminals 14. The capacitors 12 are wound to a predetermined capacitance value.

A predetermined number of the capacitors which will provide the desired capacitance value are arranged side by side in rows with the several rows in side by side relation to one another. Thus supported, the capacitors are then interconnected electrically by welding strap wires 16 longitudinally of the rows to the terminals 14 at opposite ends of the capacitors. Transversely disposed strap wires 18 are resistance welded to the terminals at opposite ends of the capacitors at the ends of the several rows. The strap wires also serve to connect the capacitors together into a unitary assembly. It will be understood that the components may also be elecrically interconnected in series or series parallel arrangements as desired.

To provide electrical connections for the capacitor assembly 13 a pair of terminals 20, 20 are resistance welded or otherwise bonded respectively to the ends of a pair of wire leads 22, 22. The other end portions of wire leads are then resistance welded respectively to the terminals 14, 14 at opposite ends of several of the capacitors with the connector terminals 20, 20 and portions of the leads 22, 22 extending from one end of the capacitor assembly.

For the encapsulation of the capacitor assembly 13, a metal container 24 having an open end is provided. The container 24 conforms generally to the outline of the capacitor assembly and is of a size sufficient to receive the assembly therein and provide ample space for potting and encapsulating material around the capacitor assembly. The height of the container varies in accordance with the number of capacitors in the assembly.

To the inside of the container a coating 26 of resin is applied which when cured forms a dielectric lining that is hard and impervious to moisture. Suitable for this purpose is an epoxy resin which is obtainable under the trade name of "Armstrong" from Armstrong Products Company, Incorporated, Warsaw, Indiana. The epoxy resin, in powder form, is sprayed onto the inner surface of the container after the container has been heated to a predetermined temperature of approximately 400° F. The epoxy resin is then allowed to cure in situ.

Another resin suitable for lining the container is an acrylonitrile-butadiene-styrene-copolymer in powder or solid form and obtainable under the trade name of "Cycolac" from Marbon Chemical, Division of Borg-Warner Corporation, Washington, West Virginia. The resin in powder form is sprayed onto the inside of the heated container and in solid form the resin is flame sprayed thereon.

Into the epoxy lined container is poured a predetermined amount of fluid potting compound of a type which cures at a temperature that is not injurious to the components and provides a resilient rubber-like body for supporting the capacitor assembly. While the potting compound is in an uncured and fluid condition, the capacitor assembly 13 is submerged therein and is supported by means of the leads 22, 22 in a predetermined position within the container in spaced relation to the epoxy lining thereof. The potting compound is then cured and forms a cushion that surrounds and yieldably supports the capacitor assembly and serves to dampen vibrations from the container.

A potting compound suitable for the purpose is a urethane elastomer resin obtainable under the name of "Polycin" from Baker Castor Oil Company, Bayonne, New Jersey. A resilient epoxy casting resin obtainable under the name of "Thiokol" from Thiokol Chemical Corporation, Trenton, New Jersey, may also be used. Also suitable is a silicone casting resin. So also is room temperature vulcanizing silicone rubber. Such a rubber may be obtained under the trade name of "Silastic" from Dow Chemical Company, Midland, Mich.

As shown in FIG. 1, a space is provided in the upper end of the lined container above the capacitor assembly and the upper level of the resilient body of potting compound. With the leads 22, 22 and the connector terminals 20, 20 held in preselected positions, a predetermined amount of fluid epoxy casting resin is poured into the space at the upper end of the container and is cured to form a hard impact resistant closure layer 30. The epoxy closure layer 30 during curing becomes bonded to the epoxy lining 26 and also embeds and seals portions of the connector terminals 20, 20 therein. The epoxy lining 26 and the epoxy closure layer 30 form a capsule around the capacitor assembly 13 and the resilient enclosure 28 and protects the same from moisture and the atmosphere.

From the foregoing, it will be seen that a simple and effective method is provided for making composite electrical devices of various predetermined values, and of encapsulating them in protective moisture excluding vibration damping packages.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A method of packaging a component which comprises:
   coating the inside of a metal container having an open end with a resin which is capable of curing to form a tough lining therefor impervious to moisture;
   curing said resin;
   pouring into the lined container a predetermined quantity of fluid potting compound which is capable of curing at a temperature that is not detrimental to the component being packaged and which forms a resilient body;
   submerging a component in the fluid potting compound;
   curing the potting compound to form a resilient body around the component;
   pouring into the open end portion of the lined container above the resilient body a fluid resin that is capable of curing to form a tough layer which is impervious to moisture and unites with the container lining to encapsulate the component and the resilient body therearound; and
   curing the last mentioned resin.

2. A method of encapsulating an electrical component which comprises:
   coating the inside of a metal container having an open end with an epoxy resin lining;
   curing said resin;
   pouring into the lined container a predetermined quantity of fluid polyurethane resin;
   immersing a component in the fluid polyurethane resin;
   curing the polyurethane resin to form a resilient body around the electrical component;
   pouring into the open end portion of the lined container above the resilient body of polyurethane resin a predetermined quantity of fluid epoxy resin; and
   curing the last mentioned epoxy resin to form a tough closure layer which unites with the epoxy resin lining to encapsulate the component and the resilient body of polyurethane therearound.

3. A method of encapsulating an electrical component having leads which comprises:
   coating the inside of a metal container having an open end with epoxy resin to form a lining therefor impervious to moisture;
   curing said resin;
   pouring into the lined container a predetermined quantity of fluid potting compound which is capable of curing at a temperature that is not detrimental to the component being encapsulated and which forms a resilient body;
   submerging a component in the fluid potting compound with the leads of the component extending from the compound and from the open end of the lined container;
   curing the potting compound to form a resilient support for the electrical component;
   pouring into the open end portion of the lined container above the resilient body of potting compound a quantity of fluid epoxy resin; and
   curing the last mentioned resin to form a layer of epoxy resin which units with the epoxy resin lining to encapsulate the component and the resilient body of potting compound therearound and which seals in the leads extending therethrough.

4. A method of potting a component, which comprises:
   heating a metal container having an open end;
   spraying powdered epoxy resin onto the inner surfaces of the heated container to form a lining therefor;
   curing the epoxy resin;
   pouring into the lined container a quantity of fluid potting compound of a type which cures at substantially room temperature and forms a rubber-like resilient body;
   immersing an electrical component having leads into the potting compound while the compound is in the fluid state and supporting the component therein with the leads extending therefrom and through the open end of the lined container;
   curing the potting compound to form a resilient body around the component;
   pouring into the open end portion of the lined container above the resilient body of potting compound a fluid epoxy resin to form a closure which when cured is bonded to the epoxy resin lining and forms therewith a capsule around the component and the resilient body therearound; and
   curing the closure forming epoxy resin.

5. A method of fabricating electrical devices, which comprises:
   arranging electrical components having terminals on opposite ends thereof in laterally abutting rows;
   resistance welding wires respectively to the rows of terminals longitudinally of the rows;
   resistance welding wires transversely of the rows to the terminals of selected components of the several rows to interconnect electrically the terminals at respective ends of the components and to secure the components together in a group;
   welding leads respectively to the terminals at opposite ends of some of the components;
   lining the inside of a metal container having an open end with an epoxy resin;
   curing said epoxy resin;
   placing into the lined container a quantity of fluid polyurethane resin;
   submerging the group of components in said fluid polyurethane resin with the leads extending therefrom and from the open end of the container;

curing the polyurethane resin to form a resilient body around the group of components;

pouring fluid epoxy resin into the open end portion of the lined container above the resilient body of polyurethane resin; and curing the last named epoxy resin to form a closure for the container which unites with the epoxy resin lining to encapsulate the group of components and the resilient body of polyurethane therearound and which seals in portions of the leads that extend therethrough.

References Cited

UNITED STATES PATENTS

| | | | |
|---|---|---|---|
| 2,809,332 | 10/1957 | Sherwood | 264—272 X |
| 2,857,626 | 10/1958 | Wagner, et al. | 264—135 |
| 3,251,015 | 5/1966 | Denham | 264—272 X |

ROBERT F. WHITE, *Primary Examiner.*

J. H. SILBAUGH, *Assistant Examiner.*